United States Patent
Shiau et al.

(10) Patent No.: US 11,947,217 B2
(45) Date of Patent: Apr. 2, 2024

(54) BACKLIGHT MODULE AND DISPLAY APPARATUS

(71) Applicant: Coretronic Corporation, Hsin-Chu (TW)

(72) Inventors: Tzeng-Ke Shiau, Hsin-Chu (TW); Yi-Cheng Lin, Hsin-Chu (TW); Chia-Liang Kang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/971,630

(22) Filed: Oct. 23, 2022

(65) Prior Publication Data

US 2023/0130456 A1 Apr. 27, 2023

(30) Foreign Application Priority Data

Oct. 25, 2021 (CN) .......................... 202122565829.4

(51) Int. Cl.
*G02F 1/00* (2006.01)
*F21V 8/00* (2006.01)
*G02F 1/1335* (2006.01)
*G02F 1/13357* (2006.01)

(52) U.S. Cl.
CPC ..... *G02F 1/133605* (2013.01); *G02B 6/0025* (2013.01); *G02F 1/133607* (2021.01)

(58) Field of Classification Search
CPC ...... G02F 1/133605–133607; G02F 1/133615; G02B 6/0031
See application file for complete search history.

(56) References Cited

U.S. PATENT DOCUMENTS

| 2005/0041410 A1* | 2/2005 | Yamashita | G02B 6/0053 362/620 |
| 2011/0157518 A1* | 6/2011 | Ham | G02B 5/045 349/64 |
| 2018/0106950 A1* | 4/2018 | Kuo | G02B 6/0055 |
| 2019/0369323 A1* | 12/2019 | Huang | G02F 1/1336 |
| 2020/0124909 A1* | 4/2020 | Ueba | G09F 9/00 |
| 2022/0299698 A1* | 9/2022 | Takeda | G02B 6/0051 |

FOREIGN PATENT DOCUMENTS

| CN | 110554534 | 12/2019 | |
| CN | 212229388 U | * 12/2020 | ........ G02B 6/0036 |
| TW | 200903058 | 1/2009 | |

* cited by examiner

*Primary Examiner* — Gerald J Sufleta, II
(74) *Attorney, Agent, or Firm* — JCIPRNET

(57) ABSTRACT

A backlight module including a light guide plate, a light source, a diffuse reflector and a light-splitting film is provided. The light guide plate has a light incident surface, and a light-emitting surface and a bottom surface which are respectively connected to the light incident surface and opposite to each other. The light source is disposed on one side of the light incident surface of the light guide plate. The diffuse reflector is disposed on one side of the bottom surface of the light guide plate. The light-splitting film is disposed between the light guide plate and the diffuse reflector. The light-splitting film has a substrate and a plurality of first optical microstructures disposed on one side of the substrate. An extending direction of the first optical microstructures intersects with the light incident surface of the light guide plate. A display apparatus using the backlight module is also provided.

12 Claims, 2 Drawing Sheets

BACKLIGHT MODULE AND DISPLAY APPARATUS

CROSS-REFERENCE TO RELATED APPLICATION

This application claims the priority benefit of China application serial no. 202122565829.4 filed on Oct. 25, 2021. The entirety of the above-mentioned patent application is hereby incorporated by reference herein and made a part of this specification.

BACKGROUND

Technical Field

The disclosure relates to an optical module and a display apparatus, and particularly relates to a backlight module and a display apparatus.

Description of Related Art

Along with increasing application of non-self-luminous displays such as liquid crystal displays, a design of a backlight module also needs to be adjusted for different usage situations. An edge-lit type backlight module has become a mainstream in the market because that it can meet the demand for a thin display apparatus. Generally, in order to improve a light energy utilization rate of a light source, such edge-lit type backlight module is mostly configured with a reflector on one side of a light guide plate away from a light-emitting surface. The reflector is, for example, a white reflector with a diffuse reflection characteristic or a silver reflector with a specular reflection characteristic.

When the reflector has the diffuse reflection characteristic, light output uniformity and defect concealment of the backlight module may be improved, but light efficiency thereof is lower. On the contrary, when the reflector has the specular reflection characteristic, the light efficiency of the backlight module may be effectively improved, but defect concealment thereof is poor, and cost thereof is relatively high. Therefore, how to balance the light efficiency, the defect concealment and the production cost of the backlight module is one of the difficult problems encountered by related manufacturers in design and development of backlight modules.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a backlight module, which is adapted to balance defect concealment and light efficiency, and has a lower production cost.

The disclosure is directed to a display apparatus, which has better display quality.

Other objects and advantages of the disclosure may be further illustrated by the technical features broadly embodied and described as follows.

In order to achieve one or a portion of or all of the objects or other objects, an embodiment of the disclosure provides a backlight module. The backlight module includes a light guide plate, a light source, a diffuse reflector and a light-splitting film. The light guide plate has a light incident surface, and a light-emitting surface and a bottom surface which are respectively connected to the light incident surface and opposite to each other. The light source is disposed on one side of the light incident surface of the light guide plate. The diffuse reflector is disposed on one side of the bottom surface of the light guide plate. The light-splitting film is disposed between the light guide plate and the diffuse reflector. The light-splitting film has a substrate and a plurality of first optical microstructures disposed on one side of the substrate. An extending direction of the first optical microstructures intersects with the light incident surface of the light guide plate.

In order to achieve one or a portion of or all of the objects or other objects, an embodiment of the disclosure provides a display apparatus. The display apparatus includes a backlight module and a display panel. The backlight module includes a light guide plate, a light source, a diffuse reflector and a light-splitting film. The light guide plate has a light incident surface, and a light-emitting surface and a bottom surface which are respectively connected to the light incident surface and opposite to each other. The light source is disposed on one side of the light incident surface of the light guide plate. The diffuse reflector is disposed on one side of the bottom surface of the light guide plate. The light-splitting film is disposed between the light guide plate and the diffuse reflector. The light-splitting film has a substrate and a plurality of first optical microstructures disposed on one side of the substrate. An extending direction of the first optical microstructures intersects with the light incident surface of the light guide plate. The display panel is disposed on one side of the light-emitting surface of the light guide plate and is overlapped with the light-emitting surface.

According to the above description, in the backlight module and the display panel of an embodiment of the disclosure, the diffuse reflector is provided on one side of the bottom surface of the light guide plate, so that the backlight module of the disclosure may have better light output uniformity and lower cost. On the other hand, by arranging the light-splitting film between the diffuse reflector and the light guide plate, light efficiency of the backlight module is further improved, and through different designs of the optical microstructures on the light-splitting film, adjustment flexibility of the light efficiency and defect concealment of the backlight module is also improved.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
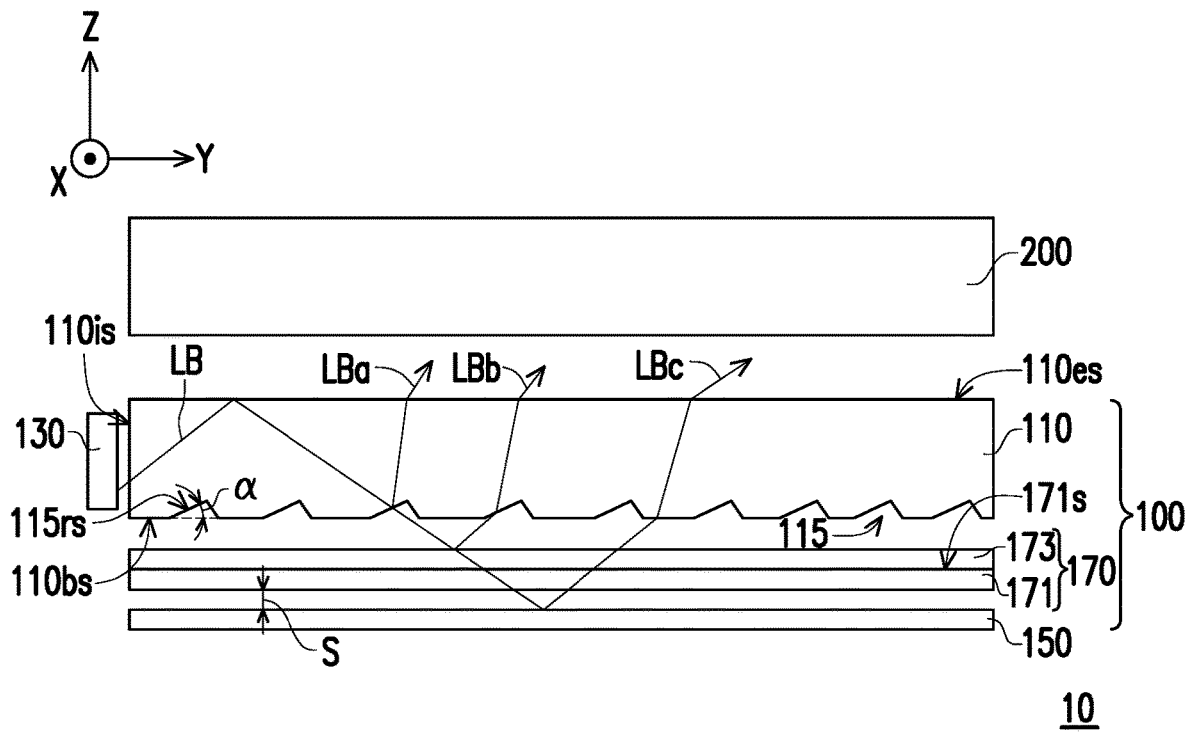
FIG. 1A and FIG. 1B are schematic side views of a display apparatus in different viewing angles according to an embodiment of the disclosure.
Figure 1B:
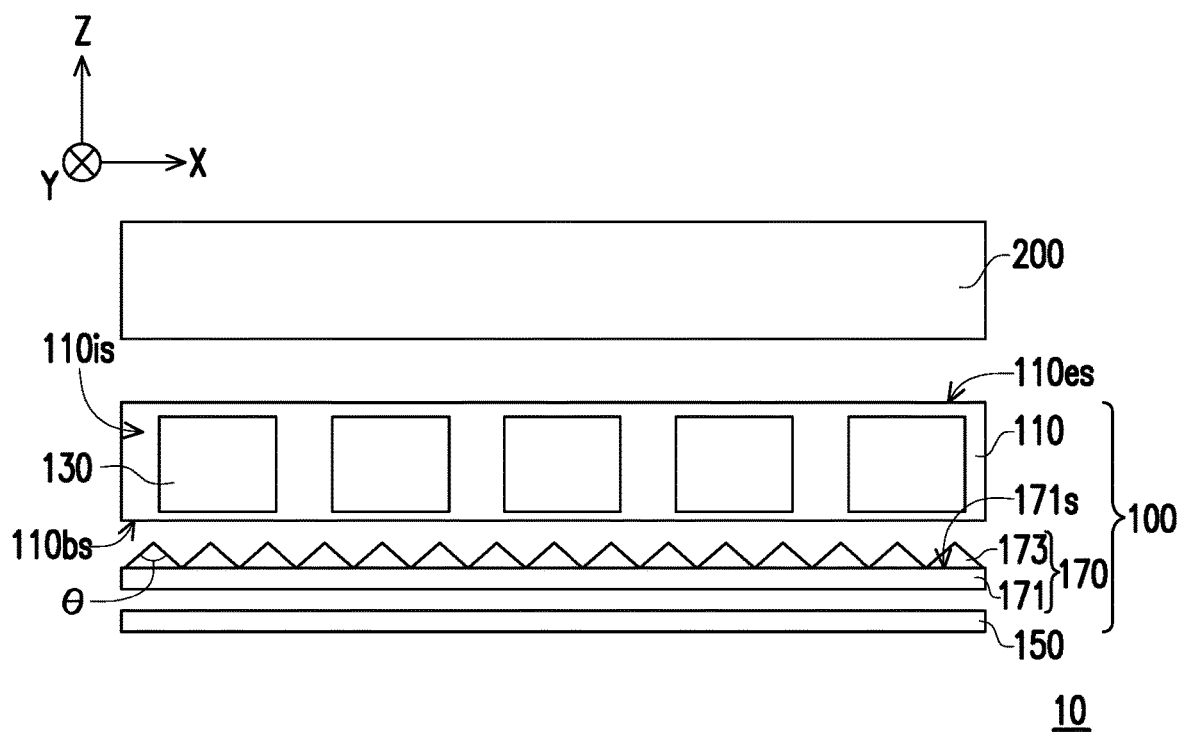
Figure 2:
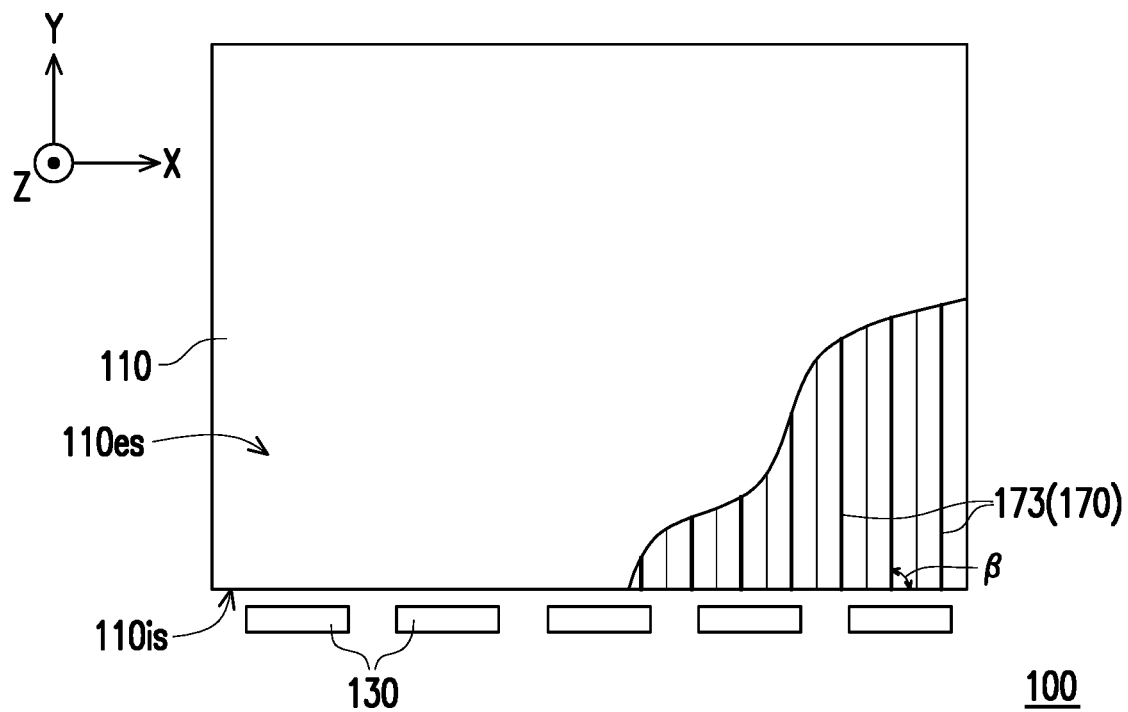
FIG. 2 is a schematic top view of a backlight module of FIG. 1A and FIG. 1B.
Figure 3:
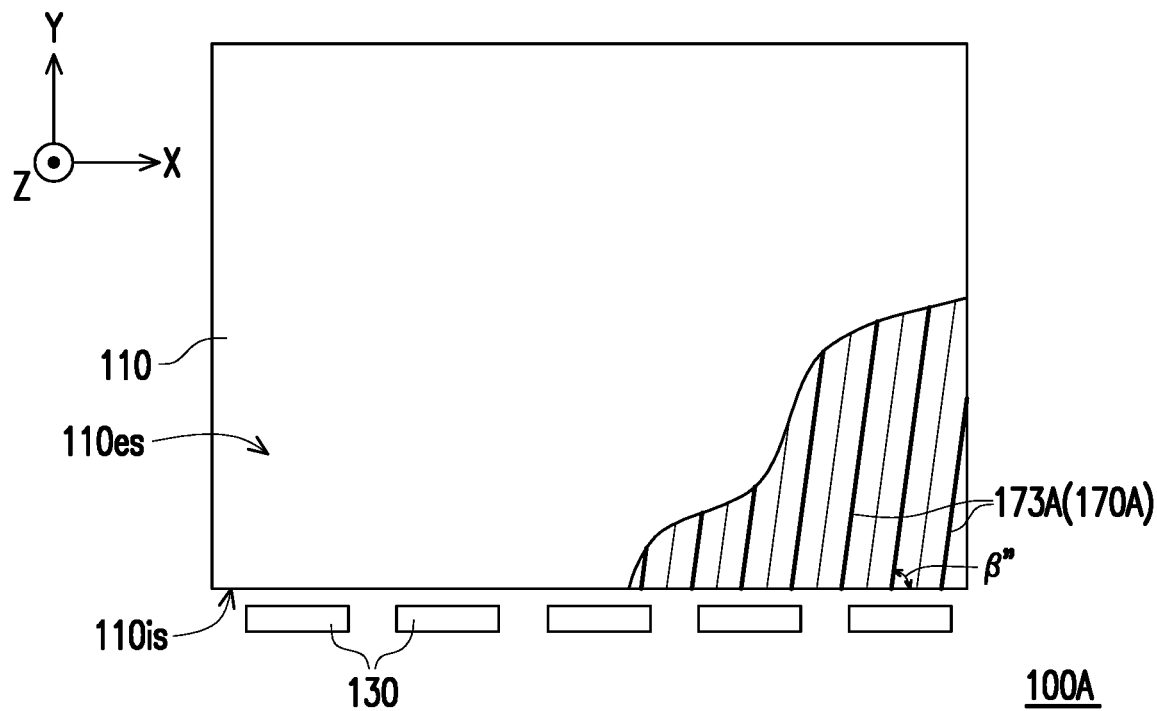
FIG. 3 is a schematic top view of a backlight module according to another embodiment of the disclosure.

FIG. 1A and FIG. 1B are schematic side views of a display apparatus in different viewing angles according to an embodiment of the disclosure. FIG. 2 is a schematic top view of a backlight module of FIG. 1A and FIG. 1B. FIG. 3 is a schematic top view of a backlight module according to another embodiment of the disclosure.

Referring to FIG. 1A, FIG. 1B and FIG. 2, the display apparatus 10 includes a backlight module 100 and a display panel 200. The backlight module 100 includes a light guide plate 110, a light source 130, a diffuse reflector 150 and a light-splitting film 170. The light guide plate 110 has a light incident surface 110is, a light-emitting surface 110es, and a bottom surface 110bs. The light-emitting surface 110es and the bottom surface 110bs are respectively connected to the light incident surface 110is and are opposite to each other. The light source 130 is disposed on one side of the light incident surface 110is of the light guide plate 110, and is used to emit a light beam LB. Namely, the backlight module 100 of the embodiment is an edge-lit type backlight module. It should be noted that, in the embodiment, the number of the light sources 130 is exemplarily illustrated by taking five as an example, which does not mean that the disclosure is limited by the content of the schematic diagram. In other embodiments, the number of the light sources 130 may be adjusted according to an optical design of the backlight module.

In the embodiment, the bottom surface 110bs of the light guide plate 110 may be selectively provided with a plurality of optical microstructures 115 (i.e., second optical microstructures), and these optical microstructures 115 are arranged along a direction Y and extend in a direction X. More specifically, an extending direction of the optical microstructures 115 is substantially parallel to the light incident surface 110is of the light guide plate 110. In the embodiment, these optical microstructures 115 may be surface microstructures recessed from the bottom surface 110bs of the light guide plate 110 (i.e., grooved microstructures), but the disclosure is not limited thereto. In other embodiments, the optical microstructures of the light guide plate may also be surface microstructures protruding from the bottom surface. In addition, according to an actual light type requirement, the light guide plate may also be provided with optical microstructures on the light-emitting surface 110es, which is not limited by the disclosure.

In the embodiment, each of the optical microstructures 115 of the light guide plate 110 has a light receiving surface 115rs closer to the light source 130, and an included angle α between the light receiving surface 115rs and the bottom surface 110bs of the optical microstructure 115 is less than 30 degrees and greater than 0 degrees. In a preferred embodiment, the included angle α may be less than 15 degrees and greater than 0 degrees. In this way, a partial light beam LBa (reflected by the optical microstructures 115) of the light beam LB may be emitted from the light-emitting surface 110es of the light guide plate 110 in a specific angle range (for example, greater than 50 degrees, where a normal direction of the light-emitting surface 110es is 0 degree), so as to achieve higher light concentration.

When the light beam LB is transmitted within the light guide plate 110 toward a direction away from the light incident surface 110is, because partial light beams (for example: a partial light beam LBb and a partial light beam LBc) will be emitted from the bottom surface 110bs, the diffuse reflector 150 provided on one side of the bottom surface 110bs of the light guide plate 110 may increase a light energy utilization rate of the backlight module 100. For example, the partial light beam LBc emitted from the bottom surface 110bs of the light guide plate 110 in FIG. 1 is reflected back to the light guide plate 110 (reflected by the diffuse reflector 150). In the embodiment, the diffuse reflector 150 is, for example, a white reflector, but the disclosure is not limited thereto. In other embodiments, the diffuse reflector 150 may also be a reflector with a reflectivity greater than 60% and having the diffuse characteristics. In other embodiments, the reflector 150 may have a reflectivity greater than 80%.

Furthermore, the light-splitting film 170 of the backlight module 100 is disposed between the light guide plate 110 and the diffuse reflector 150. The light-splitting film 170 has a substrate 171 and a plurality of optical microstructures 173 (i.e., first optical microstructures) disposed on one side of the substrate 171. An extending direction of the optical microstructures 173 intersects with the light incident surface 110is of the light guide plate 110. In the embodiment, an included angle β between the extending direction of the optical microstructures 173 and the light incident surface 110is of the light guide plate 110 may be selectively designed to 90 degrees, namely, the extending direction of the optical microstructures 173 may be perpendicular to the light incident surface 110*is* of the light guide plate 110 (as shown in FIG. 2). However, the disclosure is not limited thereto. In another embodiment, the extending direction of the optical microstructures 173 of a light-splitting film 170A of a backlight module 100A may not be perpendicular to the light incident surface 110*is* of the light guide plate 110, for example, an included angle β" between the extending direction of the optical microstructures 173A and the light incident surface 110*is* of the light guide plate 110 may also be greater than or equal to 60 degrees and less than 120 degrees (as shown in FIG. 3), and does not include 90 degrees.

In the embodiment, the optical microstructures 173 are, for example, prism structures. The prism structure has a vertex angle θ farther away from the substrate 171, and the vertex angle θ is between 60 degrees and 150 degrees. On the other hand, in the embodiment, these optical microstructures 173 may be selectively disposed on a surface 171*s* of the substrate 171 facing the light guide plate 110. In particular, through the arrangement of the light-splitting film 170, the partial light beam LBb emitted from the bottom surface 110*bs* of the light guide plate 110 may be reflected back to the light guide plate 110 (reflected by the light-splitting film 170). In this way, in addition to further improving the light efficiency of the backlight module 100, the design flexibility of the diffuse reflector 150 may also be increased. For example, a ratio between the partial light beam LBb reflected by the light-splitting film 170 and the partial light beam LBc reflected by the diffuse reflector 150 may be adjusted by the design of the optical microstructures 173 to meet the light efficiency and defect concealment required by the backlight module 100.

Namely, the diffuse reflector 150 of the disclosure may use different degrees of diffuse characteristics to adjust the defect concealment or light output uniformity of the backlight module 100, and the arrangement of the light-splitting film 170 may be used to achieve a balance between the light efficiency and the defect concealment. From another point of view, through the arrangement of the diffuse reflector 150, the light-splitting film 170 does not need to have a haze value, or only needs to have a lower haze value (for example, the haze value may be less than 10%, or 5%) to allow the backlight module 100 to produce sufficient defect concealment, and may further improve the light efficiency of the backlight module 100 used in collaboration with the diffuse reflector 150 (for example, a white reflector). For example, a light output brightness of the backlight module using the white reflector is about 24% less than that of the backlight module using a specular reflector, and through the configuration of the light-splitting film 170 of the disclosure, the loss of the light output brightness is reduce to about 4%.

On the other hand, since the optical microstructures 173 of the embodiment are disposed on the surface 171*s* of the substrate 171 away from the diffuse reflector 150, the light-splitting film 170 and the diffuse reflector 150 may selectively have a space S therebetween to further avoid generating a moiré phenomenon and an optical wet out phenomenon due to stacking of the light-splitting film 170 and the diffuse reflector 150. However, the disclosure is not limited thereto. The optical microstructures of the light-splitting film may also be arranged on the surface of the substrate 171 facing the diffuse reflector 150 to solve the optical wet out and moiré phenomenon caused by the stacking of the two films, and the two films do not need to be spaced apart.

In the embodiment, the display panel 200 of the display apparatus 10 is arranged on the backlight module 100 in an overlapped manner. More specifically, the display panel 200 is disposed on one side of the light-emitting surface 110*es* of the light guide plate 110, and is overlapped with the light-emitting surface 110*es* along a normal direction (for example, a direction Z) of the light-emitting surface 110*es*. For example, the display panel 200 may be a liquid crystal display panel or other suitable non-self-luminous display panels.

In summary, in the backlight module and the display panel of an embodiment of the disclosure, the diffuse reflector is provided on one side of the bottom surface of the light guide plate, so that the backlight module of the disclosure may have better light output uniformity and lower cost. On the other hand, by arranging the light-splitting film between the diffuse reflector and the light guide plate, light efficiency of the backlight module is further improved, and through different designs of the optical microstructures on the light-splitting film, adjustment flexibility of the light efficiency and defect concealment of the backlight module is also improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A backlight module, comprising:
   a light guide plate, having a light incident surface, a light-emitting surface and a bottom surface, the light-emitting surface and the bottom surface are respectively connected to the light incident surface and opposite to each other;
   a light source, disposed on one side of the light incident surface of the light guide plate;
   a diffuse reflector, disposed on one side of the bottom surface of the light guide plate; and
   a light-splitting film, disposed between the light guide plate and the diffuse reflector, the light-splitting film having a substrate and a plurality of first optical microstructures disposed on one side of the substrate, wherein an extending direction of a long side of each of the plurality of first optical microstructures intersects with the light incident surface of the light guide plate.

2. The backlight module as claimed in claim 1, further comprising:
   a plurality of second optical microstructures, disposed on the bottom surface of the light guide plate, wherein each of the second optical microstructures has a light receiving surface closer to the light source, and an included angle between the light receiving surface and the bottom surface is less than 30 degrees and greater than 0 degree.

3. The backlight module as claimed in claim 1, wherein an included angle between the extending direction of the plurality of first optical microstructures and the light incident surface of the light guide plate is greater than or equal to 60 degrees and less than or equal to 120 degrees.

4. The backlight module as claimed in claim 1, wherein the diffuse reflector is a white reflector.

5. The backlight module as claimed in claim 1, wherein a reflectivity of the diffuse reflector is greater than 60%.

6. The backlight module as claimed in claim 1, wherein each of the plurality of first optical microstructures is a prism structure, and the prism structure has a vertex angle farther away from the substrate, and the vertex angle is between 60 degrees and 150 degrees.

7. The backlight module as claimed in claim 1, wherein the first optical microstructures are arranged on a surface of the substrate facing the light guide plate.

8. The backlight module as claimed in claim 7, wherein there is a space between the light-splitting film and the diffuse reflector.

9. The backlight module as claimed in claim 1, wherein a haze value of the light-splitting film is less than 10%.

10. A display apparatus, comprising:
    a backlight module, comprising:
        a light guide plate, having a light incident surface and a light-emitting surface and a bottom surface that are respectively connected to the light incident surface and opposite to each other;
        a light source, disposed on one side of the light incident surface of the light guide plate;
        a diffuse reflector, disposed on one side of the bottom surface of the light guide plate; and
        a light-splitting film, disposed between the light guide plate and the diffuse reflector, the light-splitting film having a substrate and a plurality of first optical microstructures disposed on one side of the substrate, wherein an extending direction of a long side of each of the first optical microstructures intersects with the light incident surface of the light guide plate; and
    a display panel, disposed on one side of the light-emitting surface of the light guide plate, and overlapped with the light-emitting surface.

11. A backlight module, comprising:
    a light guide plate, having a light incident surface, a light-emitting surface and a bottom surface, the light-emitting surface and the bottom surface are respectively connected to the light incident surface and opposite to each other;
    a light source, disposed on one side of the light incident surface of the light guide plate;
    a diffuse reflector, disposed on one side of the bottom surface of the light guide plate;
    a light-splitting film, disposed between the light guide plate and the diffuse reflector, the light-splitting film having a substrate and a plurality of first optical microstructures disposed on one side of the substrate, wherein an extending direction of the plurality of first optical microstructures intersects with the light incident surface of the light guide plate; and
    a plurality of second optical microstructures, disposed on the bottom surface of the light guide plate, wherein each of the second optical microstructures has a light receiving surface closer to the light source, and an included angle between the light receiving surface and the bottom surface is less than 30 degrees and greater than 0 degree.

12. A display apparatus, comprising:
    a backlight module, comprising:
        a light guide plate, having a light incident surface and a light-emitting surface and a bottom surface that are respectively connected to the light incident surface and opposite to each other;
        a light source, disposed on one side of the light incident surface of the light guide plate;
        a diffuse reflector, disposed on one side of the bottom surface of the light guide plate;
        a light-splitting film, disposed between the light guide plate and the diffuse reflector, the light-splitting film having a substrate and a plurality of first optical microstructures disposed on one side of the substrate, wherein an extending direction of the first optical microstructures intersects with the light incident surface of the light guide plate; and
        a plurality of second optical microstructures, disposed on the bottom surface of the light guide plate, wherein each of the second optical microstructures has a light receiving surface closer to the light source, and an included angle between the light receiving surface and the bottom surface is less than 30 degrees and greater than 0 degree; and
    a display panel, disposed on one side of the light-emitting surface of the light guide plate, and overlapped with the light-emitting surface.

* * * * *